US010929733B2

(12) United States Patent
Cheng

(10) Patent No.: US 10,929,733 B2
(45) Date of Patent: Feb. 23, 2021

(54) ELECTRONIC TAG, DATA WRITING TERMINAL AND ELECTRONIC TAG SYSTEM

(71) Applicant: BOE Technology Group Co., Ltd., Beijing (CN)

(72) Inventor: Xinyi Cheng, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/471,445

(22) PCT Filed: Nov. 27, 2018

(86) PCT No.: PCT/CN2018/117714
§ 371 (c)(1),
(2) Date: Jun. 19, 2019

(87) PCT Pub. No.: WO2019/205619
PCT Pub. Date: Oct. 31, 2019

(65) Prior Publication Data
US 2020/0218954 A1 Jul. 9, 2020

(30) Foreign Application Priority Data

Apr. 26, 2018 (CN) .......................... 201810387263.0

(51) Int. Cl.
*G06K 19/06* (2006.01)
*G06K 19/07* (2006.01)
(Continued)

(52) U.S. Cl.
CPC ..... *G06K 19/0709* (2013.01); *G06K 19/0723* (2013.01); *H02J 50/12* (2016.02); *H02J 50/80* (2016.02)

(58) Field of Classification Search
CPC ............ G06K 19/07749; G07F 7/1008; G06Q 20/341
(Continued)

(56) References Cited

U.S. PATENT DOCUMENTS 9,251,458 B2   2/2016   Finn et al.
9,444,290 B2   9/2016   Chuang
(Continued)

FOREIGN PATENT DOCUMENTS

CN   103106422 A   5/2013
CN   103390185 A   11/2013
(Continued)

OTHER PUBLICATIONS

International Search Report and Written Opinion, including English translation of search report and Box V of the Written Opinion, for International Application No. PCT/CN2018/117714, dated Mar. 6, 2019, 13 pages.
(Continued)

*Primary Examiner* — Ahshik Kim
(74) *Attorney, Agent, or Firm* — Westman, Champlin & Koehler, P.A.

(57) ABSTRACT

The present application discloses an electronic tag, a data writing terminal, and an electronic tag system. The electronic tag includes: a display screen; a first electromagnetic induction coil configured to receive power and display information from a data writing terminal through electromagnetic coupling; and a main controller configured to acquire the display information from the first electromagnetic induction coil, and control the display screen to display the display information.

9 Claims, 2 Drawing Sheets

(51) Int. Cl.
*H02J 50/80* (2016.01)
*H02J 50/12* (2016.01)

(58) Field of Classification Search
USPC .......................................................... 235/492
See application file for complete search history.

(56) References Cited

U.S. PATENT DOCUMENTS

| | | | |
|---|---|---|---|
| 10,079,508 | B2 | 9/2018 | Mehas et al. |
| 2006/0176239 | A1 | 8/2006 | Sweeney |
| 2010/0079416 | A1* | 4/2010 | Chung ............... G09G 3/34 345/204 |
| 2010/0084467 | A1* | 4/2010 | Nishido ............ G06K 19/0701 235/451 |
| 2013/0292463 | A1* | 11/2013 | Chen ............... G06K 19/083 235/375 |
| 2014/0111032 | A1* | 4/2014 | Shearer ............ G06K 19/0707 307/149 |
| 2014/0240099 | A1 | 8/2014 | Chuang |
| 2015/0028108 | A1* | 1/2015 | Smith ............. G06K 19/07754 235/492 |
| 2016/0218520 | A1 | 7/2016 | Mehas et al. |
| 2017/0193124 | A1* | 7/2017 | Wong, Jr. .......... G06K 19/0723 |
| 2017/0270323 | A1* | 9/2017 | Butler ............... G06K 7/10198 |

FOREIGN PATENT DOCUMENTS

| | | |
|---|---|---|
| CN | 104517083 A | 4/2015 |
| CN | 104766552 A | 7/2015 |
| CN | 107430010 A | 12/2017 |
| CN | 107766906 A | 3/2018 |
| CN | 207117271 U | 3/2018 |
| CN | 108805247 A | 11/2018 |
| TW | 201417543 A | 5/2014 |

OTHER PUBLICATIONS

First Office Action, including Search Report, for Chinese Patent Application No. 201810387263.0, dated Nov. 29, 2019, 19 pages.

* cited by examiner

ELECTRONIC TAG, DATA WRITING TERMINAL AND ELECTRONIC TAG SYSTEM

CROSS-REFERENCE TO RELATED APPLICATION(S)

The present application is a Section 371 National Stage application of International Application No. PCT/CN2018/117714, filed on 27 Nov. 2018, which has not yet published, and claims priority to Chinese Patent Application No. 201810387263.0, filed on Apr. 26, 2018, the contents of which are incorporated herein by reference.

The present application claims priority to the Chinese Patent Application No. 201810387263.0, filed on Apr. 26, 2018, which is incorporated herein by reference in its entirety.

TECHNICAL FIELD

The present disclosure relates to the field of electronic tags, and more particularly, to an electronic tag, a data writing terminal, and an electronic tag system.

BACKGROUND

Electronic tags are devices which enable paperless and electronic marks. For example, an in-vehicle electronic tag may be used to display an annual inspection mark of a motor vehicle. Currently, a power source of an electronic tag is a lithium battery, which supplies power to a screen of the electronic tag, so that a mark is displayed on the screen of the electronic tag. Content displayed on the screen of the electronic tag is controlled by a display controller of the electronic tag, and display of the electronic tag may be controlled by writing the content to be displayed into the display controller in advance.

The above electronic tag is powered by the lithium battery, which needs to be charged or replaced to ensure the power of the battery, so as to supply power to the screen of the electronic tag for a long time, thereby wasting manpower and electric power. In addition, if a mark needs to be replaced, content to be displayed needs to be re-written into the display controller through an interface, which results in inconvenience of the use of the electronic tag.

SUMMARY

The embodiments of the present disclosure provide an electronic tag, a data writing terminal, and an electronic tag system. The technical solutions are realized as follows.

In a first aspect, the embodiments of the present disclosure provide an electronic tag, comprising: a display screen; a first electromagnetic induction coil configured to receive power and display information from a data writing terminal through electromagnetic coupling; and a main controller configured to acquire the display information from the first electromagnetic induction coil, and control the display screen to display the display information.

In some embodiments of the present disclosure, the display screen is an electronic ink screen.

In some embodiments of the present disclosure, the electronic tag further comprises: a rectification circuit disposed between the first electromagnetic induction coil and the main controller and configured to rectify induced current generated by the first electromagnetic induction coil.

In some embodiments of the present disclosure, the electronic tag further comprises: a power receiving controller disposed between the first electromagnetic induction coil and the main controller and configured to control a voltage of an electrical signal output by the first electromagnetic induction coil to the main controller.

In some embodiments of the present disclosure, the power receiving controller is further configured to generate charging information, and transmit the charging information to the data writing terminal through the first electromagnetic induction coil.

In some embodiments of the present disclosure, the power receiving controller comprises: a transformer connected between the first electromagnetic induction coil and the main controller; a capacitor connected between the transformer and the main controller; a voltage sensor configured to detect a voltage of the capacitor; and a coil controller configured to generate the charging information according to the voltage of the capacitor.

In some embodiments of the present disclosure, the electronic tag further comprises: a communication controller configured to obtain the display information by decoding the electrical signal output by the first electromagnetic induction coil.

In some embodiments of the present disclosure, the communication controller is further configured to control the first electromagnetic induction coil to transmit a ready instruction to the data writing terminal.

In some embodiments of the present disclosure, the display information is encrypted data; and the electronic tag further comprises a decryption module configured to decrypt the encrypted data.

In some embodiments of the present disclosure, the main controller comprises a memory, and the main controller is further configured to generate an electronic tag record according to the display information, and store the electronic tag record in the memory.

In a second aspect, the embodiments of the present disclosure further provide a data writing terminal, comprising: a second electromagnetic induction coil configured to transmit power and display information to an electronic tag through electromagnetic coupling; a main controller configured to provide the display information transmitted by the second electromagnetic induction coil; and a power supply module configured to provide power to the second electromagnetic induction coil and the main controller.

In some embodiments of the present disclosure, the data writing terminal further comprises: a power supply controller configured to control a voltage output by the power supply module to the second electromagnetic induction coil.

In some embodiments of the present disclosure, the data writing terminal further comprises: a communication controller configured to control the second electromagnetic induction coil to transmit the display information to the electronic tag.

In some embodiments of the present disclosure, the data writing terminal further comprises: an encryption module configured to encrypt the display information.

In a third aspect, the embodiments of the present disclosure further provide an electronic tag system, comprising the electronic tag according to the first aspect and the data writing terminal according to the second aspect.

BRIEF DESCRIPTION OF THE ACCOMPANYING DRAWINGS

In order to more clearly illustrate the technical solutions in the embodiments of the present disclosure, the accompanying drawings which need to be used in the description of the embodiments will be briefly described below. It is obvious that the accompanying drawings in the following description are only some embodiments of the present disclosure. Other accompanying drawings may also be obtained by those of ordinary skill in the art according to these accompanying drawings without any creative work.

DETAILED DESCRIPTION

In order to make the purposes, technical solutions and advantages of the present disclosure more apparent, the embodiments of the present disclosure will be further described in detail below with reference to the accompanying drawings.

Figure 1:
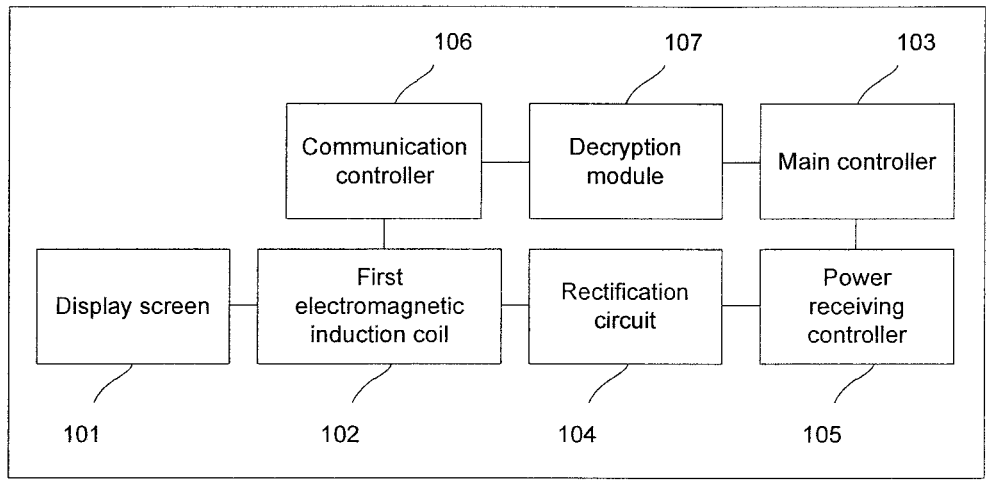
FIG. 1 is a schematic structural diagram of an electronic tag according to an embodiment of the present disclosure.

FIG. 1 is a schematic structural diagram of an electronic tag according to an embodiment of the present disclosure. As shown in FIG. 1, the electronic tag comprises a display screen 101, a first electromagnetic induction coil 102, and a main controller 103.

Here, the first electromagnetic induction coil 102 is configured to be electromagnetically coupled with a second electromagnetic induction coil of a data writing terminal, receive power from the data writing terminal through electromagnetic induction, and receive display information transmitted by the data writing terminal through electromagnetic induction; and the main controller 103 is configured to acquire the received display information from the first electromagnetic induction coil, and control the display screen to display the display information.

Here, the power received by the electronic tag is used to supply power to the display screen 101 and the main controller 103 as well as other modules in the electronic tag.

In the technical solution according to the embodiment of the present disclosure, the electronic tag is wirelessly charged through the electromagnetic induction coil, which may save manpower compared to charging a lithium battery or replacing a lithium battery; and in addition, the content to be displayed by the electronic tag is also wirelessly transmitted by the electromagnetic induction coil without writing the content to be displayed into the electronic tag through an interface in advance, which is convenient to operate.

In the present application, the main controller 103 may be implemented using an integrated circuit or a chip, for example, using a Central Processing Unit (CPU).

In an implementation of the embodiment of the present disclosure, the display screen 101 may be an electronic ink screen. In this implementation, information is displayed using the electronic ink screen. Since after the electronic ink screen has been refreshed, the content of the electronic ink screen does not change due to the electronic ink screen being in a power-down state and may be statically displayed without continuous power supply, it only needs to supply power when content of a tag is refreshed without supplying power to the screen of the electronic tag for a long time, which saves manpower and electric power.

In the embodiment of the present disclosure, the display information may be a picture or a text. After the main controller 103 acquires the display information, if the display information is a picture, the main controller 103 directly controls the electronic ink screen to display the picture, and if the display information is a text, the main controller 103 generates a picture according to the text and a predetermined format, and then controls the electronic ink screen to display the picture. Here, the main controller 103 may generate an electronic ink screen control signal according to the content to be displayed, wherein the electronic ink screen control signal comprises a data signal of each pixel in the electronic ink screen, so that the electronic ink screen displays a corresponding picture.

In other implementations of the embodiments of the present disclosure, the display screen 101 may also be other types of display screens, such as a Liquid Crystal Display (LCD), an Organic Light Emitting Diode Display (OLED), etc., as long as the display screen 101 may provide static display which does not change due to power-down, and will not be limited in the present application.

Further, the electronic tag further comprises a rectification circuit 104 disposed between the first electromagnetic induction coil 102 and the main controller 103. The rectification circuit 104 is disposed to rectify current generated by the electromagnetic induction coil, so as to better provide power to various components in the electronic tag.

Further, the electronic tag further comprises a power receiving controller 105 configured to control a voltage of an electrical signal output by the first electromagnetic induction coil 102 to the main controller 103. The voltage of the electrical signal output to the main controller 103 is controlled by the power receiving controller 105, so as to ensure operating voltages of the main controller 103 and the display screen 101. In the embodiment shown in FIG. 1, the power receiving controller 105 is connected between the rectification circuit 104 and the main controller 103.

In the embodiment of the present disclosure, the power receiving controller 105 may further be configured to generate charging information, and transmit the charging information to the data writing terminal through the first electromagnetic induction coil 102. In this way, since it needs to feed back the charging information in real time in a wireless charging process, the data writing terminal may adjust the voltage according to the information to avoid conditions such as excessive charging etc. Here, the charging information may specifically be generated by detecting a voltage of a capacitor in the power receiving controller 105 and generating the charging information comprising the voltage, and then the charging information is transmitted to the data writing terminal through electromagnetic induction, as described in detail below. It should be understood that in some embodiments of the present disclosure, the power receiving controller 105 may directly control the first electromagnetic induction coil 102 to transmit the generated charging information to the data writing terminal according to the generated charging information. In some other embodiments, the power receiving controller 105 may transmit the generated charging information to a communication controller (for example, a communication controller 106 described below) disposed in the electronic tag, and the communication controller controls the first electromagnetic induction coil 102 to transmit the generated charging information to the data writing terminal according to the generated charging information.

Further, the electronic tag further comprises the communication controller 106 configured to obtain the display information by decoding the electrical signal output by the first electromagnetic induction coil 102. The communication controller is disposed to handle communication, and is prevented from being integrated into the main controller, which, otherwise, results in more functions and complicated design of the main controller. Of course, in some other embodiments, the communication controller 106 may form a part of the main controller 103.

In the embodiment of the present disclosure, the communication controller 106 may control the first electromagnetic induction coil 102 to transmit a ready instruction to the data writing terminal, to notify the data writing terminal that it may perform data communication by transmitting the ready instruction. In some other embodiments, the main controller 103 may control the communication controller 106 to perform these operations.

In the embodiment of the present disclosure, the display information may be encrypted data. Correspondingly, the electronic tag further comprises a decryption module 107 configured to decrypt the encrypted data, to ensure information security by transmitting the encrypted data. As shown in FIG. 1, in an implementation, the decryption module may be a separate module, and may specifically be implemented by using a CPU or an encryption chip. In other implementations, the decryption module may also be integrated into the main controller, so as to realize master control and decryption functions through one chip at the same time.

Here, encryption and decryption of the display information may be performed by using a related encryption algorithm, which is not limited in the present application.

In the embodiment of the present disclosure, the main controller 103 may comprise a memory. The main controller 103 is further configured to generate an electronic tag record according to the display information, and store the electronic tag record in the memory. The memory is disposed to store a historical record of the electronic tag, so as to facilitate subsequent query of a display record of the electronic tag. Here, the memory may be an Electrically Erasable Programmable Read Only Memory (EEPROM), in which data is not lost after the memory is powered down, which may meet the requirements of the present application.

Figure 2:
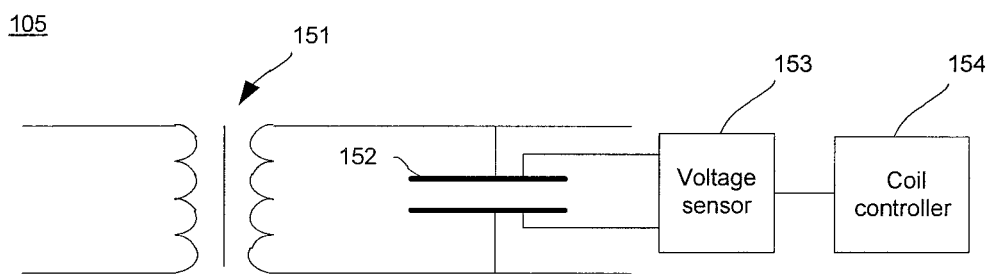
FIG. 2 is a schematic structural diagram of a power receiving controller according to an embodiment of the present disclosure.

FIG. 2 is a schematic structural diagram of a power receiving controller according to an embodiment of the present disclosure. As shown in FIG. 2, the power receiving controller 105 comprises a transformer 151, a capacitor 152, a voltage sensor 153, and a coil controller 154.

Here, the transformer 151 is connected between the first electromagnetic induction coil 102 and the main controller 103; the capacitor 152 is connected between the transformer 151 and the main controller 103; the voltage sensor 153 is configured to detect a voltage of the capacitor 152; and the coil controller 154 is configured to generate charging information according to the voltage of the capacitor 152. A degree of charging is indicated by detecting the voltage of the capacitor 152 connected between the transformer 151 and the main controller 103, and charging information is generated according to the voltage and is transmitted to the data writing terminal, so that the data writing terminal may adjust the voltage according to the charging information.

As shown in FIG. 2, in the above embodiment, the separate capacitor 152 is used as a device for storing energy and detecting electric quantity. In other embodiments, the capacitor 152 may not be separately disposed, for example, the capacitor 152 may be integrated into the transformer 151, etc., which is not limited in the present application.

In the embodiment of the present disclosure, the coil controller 154 may control the first electromagnetic induction coil 102 to operate according to the charging information. The coil controller 154 and the communication controller 106 may change an impedance characteristic of the first electromagnetic induction coil 102, so that an electrical signal sensed by the second electromagnetic induction coil 201 changes correspondingly. For example, a signal waveform having high and low levels is formed, so that the electrical signal may carry the above charging information or ready instruction. For example, a control switch and a load resistor may be connected in parallel to the electromagnetic induction coil 102, and the coil controller 154 and the communication controller 106 control whether the load resistor is connected to the circuit by controlling turn-on and turn-off of the control switch, so as to change the impedance characteristic of the first electromagnetic induction coil 102. Here, the coil controller 154 and the communication controller 106 may determine a corresponding signal waveform according to the content of the information to be transmitted, and then determine a manner of controlling the switch (for example, an order of turn-on and turn-off and duration of turn-on and turn-off) according to the signal waveform. Of course, this manner is only an example, and how to control the second electromagnetic induction coil 201 to transmit information by the coil controller 154 and the communication controller 106 is not limited in the present application.

Further, in the above implementation, the coil controller 154 and the communication controller 106 are two separate devices, and in other implementations, the coil controller 154 and the communication controller 106 may also be implemented using the same device, which is not limited in the present application.

Further, in some other embodiments, the coil controller 154 may provide the charging information to the communication controller 106 without a control function for the coil, and the communication controller 106 controls the first electromagnetic induction coil 102 to operate according to the charging information.

The electronic tag may be applied in a variety of scenes. For example, the electronic tag may be used as an in-vehicle electronic tag, which realizes paperless electronic display of a conformity inspection mark of a motor vehicle through near-field wireless charging and communication.

A workflow of the electronic tag will be briefly and exemplarily described below. When the second electromagnetic induction coil of the data writing terminal is close to the first electromagnetic induction coil of the electronic tag, the data writing terminal wirelessly supplies power to the electronic tag through electromagnetic coupling. The rectification circuit and the power receiving controller in the electronic tag operate to output operating voltages; the main controller and the decryption module in the electronic tag start operating, and transmit a ready instruction to the data writing terminal through the first electromagnetic induction coil; the data writing terminal starts wireless communication with the electronic tag, and transmits the encrypted display information to the electronic tag, and the main controller and the decryption module in the electronic tag receive and decrypt the encrypted display information; and the main controller refreshes the electronic ink screen according to the display information, and stores the display information in a memory in the main controller to complete the workflow once. After the refresh is completed, the data writing terminal leaves the electronic tag, the main controller stops operating after the electronic tag runs out of power, and the content of the electronic ink screen does not change due to the electronic ink screen being in a power-down state after the refresh is completed.

Figure 3:
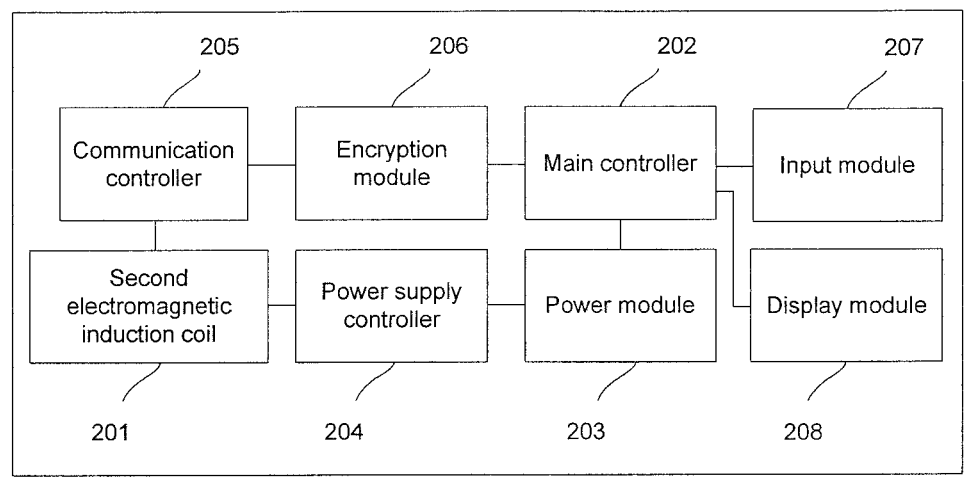
FIG. 3 is a schematic structural diagram of a data writing terminal according to an embodiment of the present disclosure.

FIG. 3 is a schematic structural diagram of a data writing terminal according to an embodiment of the present disclosure. As shown in FIG. 3, the data writing terminal comprises a second electromagnetic induction coil 201, a main controller 202, and a power supply module 203.

Here, the second electromagnetic induction coil 201 is configured to be electromagnetically coupled with the first electromagnetic induction coil of the electronic tag, and transmit power and display information to the electronic tag through electromagnetic induction; the main controller 202 is configured to acquire the display information, and provide the display information to the second electromagnetic induction coil 201; and the power supply module 203 is configured to provide power to the second electromagnetic induction coil 201 and the main controller 202.

In the technical solution according to the embodiment of the present disclosure, the electronic tag is wirelessly charged through the electromagnetic induction coil, which may save manpower compared to charging a lithium battery or replacing a lithium battery; and in addition, the content to be displayed by the electronic tag is also wirelessly transmitted by the electromagnetic induction coil without writing the content to be displayed into the electronic tag through an interface in advance, which is convenient to operate.

Here, the power supply module 203 may be a battery, such as a lithium battery or other types of batteries. Of course, the power supply module 203 may also be other types of power sources, such as a Direct Current (DC) power source etc.

Further, the data writing terminal further comprises a power supply controller 204 configured to control a voltage output by the power supply module 203 to the second electromagnetic induction coil 201. The operating voltage is controlled through the power supply controller 204, so that the data writing terminal may adjust the voltage according to the charging information of the electronic tag to avoid conditions such as excessive charging etc.

Here, the power supply controller 204 may comprise a transformer, and the voltage output by the power supply module 203 to the second electromagnetic induction coil 201 is controlled by the transformer. The transformer may be controlled by the main controller 202 in control manner which may be as described later.

Further, the data writing terminal further comprises a communication controller 205 configured to control the second electromagnetic induction coil 201 to transmit the display information to the electronic tag. The communication controller is disposed to handle communication, and is prevented from being integrated into the main controller, which, otherwise, results in more functions and complicated design of the main controller. Of course, in some other embodiments, the communication controller 205 may form a part of the main controller 202.

In some embodiments, in addition to being responsible for controlling the second electromagnetic induction coil 201 to transmit the display information, the communication controller 205 is also responsible for decoding the electrical signal received by the second electromagnetic induction coil 201 to obtain the charging information transmitted by the electronic tag. The main controller 202 controls an operation of the transformer of the power supply controller 204 according to the charging information, to adjust the voltage provided to the electronic tag. For example, when the charging information indicates that the voltage of the capacitor in the electronic tag is low (for example, less than a threshold), the main controller 202 controls the transformer to output a first voltage, and when the charging information indicates that the voltage of the capacitor in the electronic tag is high (for example, no less than the threshold), the main controller 202 controls the transformer to output a second voltage, wherein the first voltage is greater than the second voltage.

An operation manner of the communication controller 205 may be known with reference that of the communication controller 106 in the electronic tag described above, and will not be described in detail herein again.

Further, the data writing terminal may further comprise an encryption module 206 configured to encrypt the display information, to ensure information security by encrypting data. As shown in FIG. 3, in an implementation, the encryption module may be a separate module, and may specifically be implemented by using a CPU or an encryption chip. In other implementations, the encryption module may also be integrated into the main controller, so as to realize master control and encryption functions through one chip at the same time.

Further, the data writing terminal may further comprise an input module 207 configured to be used by a user to input the display information. The input module 207 comprises, but is not limited to, an input apparatus such as a keyboard input apparatus, a touch input apparatus, a voice recognition input apparatus, etc. In some embodiments, in order to facilitate input, the data writing terminal may further comprise a display module 208 configured to display the content input by the user. At the same time, the display module 208 may also be used to display the charging information of the electronic tag described above. The display module 208 may be a common display device, such as an LCD, an OLED, etc., which is not limited in the present application.

An overall structure of the data writing terminal may be a handheld data writing terminal, which is convenient for users to use.

Figure 4:
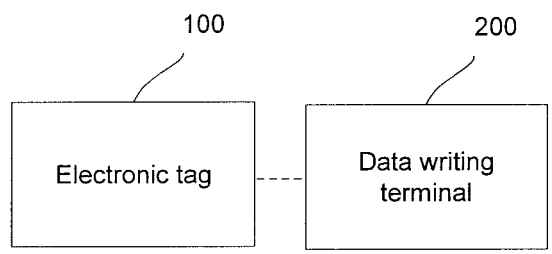
FIG. 4 is a schematic structural diagram of an electronic tag system according to an embodiment of the present disclosure.

FIG. 4 is a schematic structural diagram of an electronic tag system according to an embodiment of the present disclosure. As shown in FIG. 4, the electronic tag system comprises the electronic tag 100 as shown in FIG. 1 and the data writing terminal 200 as shown in FIG. 3.

In the technical solution according to the embodiment of the present disclosure, the electronic tag is wirelessly charged through the electromagnetic induction coil, which may save manpower compared to charging a lithium battery or replacing a lithium battery; and in addition, the content to be displayed by the electronic tag is also wirelessly transmitted by the electromagnetic induction coil without writing the content to be displayed into the electronic tag through an interface in advance, which is convenient to operate.

It may be understood by those of ordinary skill in the art that all or a part of steps of implementing the above embodiments may be completed by hardware, or may also be completed by a program instructing related hardware. The program may be stored in a computer readable storage medium. The storage medium described above may be a read only memory, a magnetic disk or an optical disk etc.

The above description is merely preferable embodiments of the present disclosure, and is not intended to limit the present disclosure. Any modifications, equivalent substitutions, improvements etc. which are made within the spirit and principle of the present disclosure should fall within the protection scope of the present disclosure.

I claim:

1. An electronic tag, comprising:
a display screen, wherein the display screen is an electronic ink screen;
a first electromagnetic induction coil configured to receive power and display information related to a conformity inspection mark of a motor vehicle from a data writing terminal through electromagnetic coupling;
a main controller configured to acquire the display information from the first electromagnetic induction coil, and control the display screen to display the display information;
a rectification circuit disposed between the first electromagnetic induction coil and the main controller and configured to rectify induced current generated by the first electromagnetic induction coil; and
a power receiving controller disposed between the first electromagnetic induction coil and the main controller and configured to control a voltage of an electrical signal output by the first electromagnetic induction coil to the main controller,
generate charging information, and transmit the charging information to the data writing terminal through the first electromagnetic induction coil,
wherein the power receiving controller comprises:
a transformer connected between the first electromagnetic induction coil and the main controller;
a capacitor connected between the transformer and the main controller;
a voltage sensor configured to detect a voltage of the capacitor; and
a coil controller connected to the voltage sensor and the first electromagnetic induction coil, and configured to generate the charging information according to the voltage of the capacitor and control the first electromagnetic induction coil to operate according to the charging information by changing an impedance characteristic of the first electromagnetic induction coil.

2. The electronic tag according to claim 1, further comprising:
a communication controller configured to obtain the display information by decoding the electrical signal output by the first electromagnetic induction coil.

3. The electronic tag according to claim 2, wherein the communication controller is further configured to control the first electromagnetic induction coil to transmit a ready instruction to the data writing terminal.

4. The electronic tag according to claim 1, wherein the display information is encrypted data, and
the electronic tag further comprises a decryption module configured to decrypt the encrypted data.

5. The electronic tag according to claim 4, wherein the main controller comprises a memory, and
the main controller is further configured to generate an electronic tag record according to the display information, and store the electronic tag record in the memory.

6. The electronic tag according to claim 4, further comprising:
a communication controller configured to obtain the display information by decoding the electrical signal output by the first electromagnetic induction coil.

7. A data writing terminal, comprising:
a second electromagnetic induction coil configured to transmit power and display information to an electronic tag through electromagnetic coupling;
a communication controller configured to control the second electromagnetic induction coil to transmit the display information to the electronic tag and decode an electrical signal received by the second electromagnetic induction coil to obtain charging information transmitted by the electronic tag;
a power supply module configured to provide power to the second electromagnetic induction coil and the main controller;
a power supply controller configured to control a voltage output by the power supply module to the second electromagnetic induction coil; and
a main controller configured to provide the display information transmitted by the second electromagnetic induction coil, and control an operation of a transformer of the power supply controller according to the charging information to adjust a voltage output by the power supply module to the second electromagnetic induction coil.

8. The data writing terminal according to claim 7, further comprising: an encryption module configured to encrypt the display information.

9. An electronic tag system, comprising an electronic tag and a data writing terminal,
the electronic tag comprises: a display screen, wherein the display screen is an electronic ink screen; a first electromagnetic induction coil configured to receive power and display information related to a conformity inspection mark of a motor vehicle from a data writing terminal through electromagnetic coupling; a main controller configured to acquire the display information from the first electromagnetic induction coil, and control the display screen to display the display information; a rectification circuit disposed between the first electromagnetic induction coil and the main controller and configured to rectify induced current generated by the first electromagnetic induction coil; and a power receiving controller disposed between the first electromagnetic induction coil and the main controller and configured to control a voltage of an electrical signal output by the first electromagnetic induction coil to the main controller, generate charging information, and transmit the charging information to the data writing terminal through the first electromagnetic induction coil, wherein the power receiving controller comprises a transformer connected between the first electromagnetic induction coil and the main controller, a capacitor connected between the transformer and the main controller, a voltage sensor configured to detect a voltage of the capacitor, and a coil controller connected to the voltage sensor and the first electromagnetic induction coil, and configured to generate the charging information according to the voltage of the capacitor and control the first electromagnetic induction coil to operate according to the charging information by changing an impedance characteristic of the first electromagnetic induction coil,
the data writing terminal comprises: a second electromagnetic induction coil configured to transmit power and display information to an electronic tag through electromagnetic coupling; a communication controller configured to control the second electromagnetic induction coil to transmit the display information to the electronic tag and decode an electrical signal received by the second electromagnetic induction coil to obtain charging information transmitted by the electronic tag; a power supply module configured to provide power to the second electromagnetic induction coil and the main controller; a power supply controller configured to control a voltage output by the power supply module to the second electromagnetic induction coil; and a main controller configured to provide the display information transmitted by the second electromagnetic induction coil, and control an operation of a transformer of the power supply controller according to the charging information to adjust a voltage output by the power supply module to the second electromagnetic induction coil.

* * * * *